Nov. 3, 1936.     C. M. EASON     2,059,935
CLUTCH
Filed Aug. 29, 1935     3 Sheets-Sheet 1

Inventor:
Clarence M. Eason.

Nov. 3, 1936.    C. M. EASON    2,059,935
CLUTCH
Filed Aug. 29, 1935    3 Sheets-Sheet 2

Inventor.
Clarence M. Eason.
By Brown, Jackson, Boettcher & Dienner
Attys.

Nov. 3, 1936.  C. M. EASON  2,059,935
CLUTCH
Filed Aug. 29, 1935  3 Sheets-Sheet 3
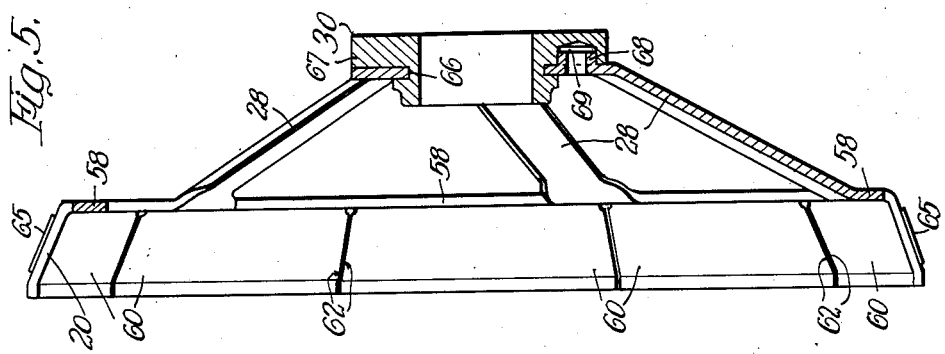
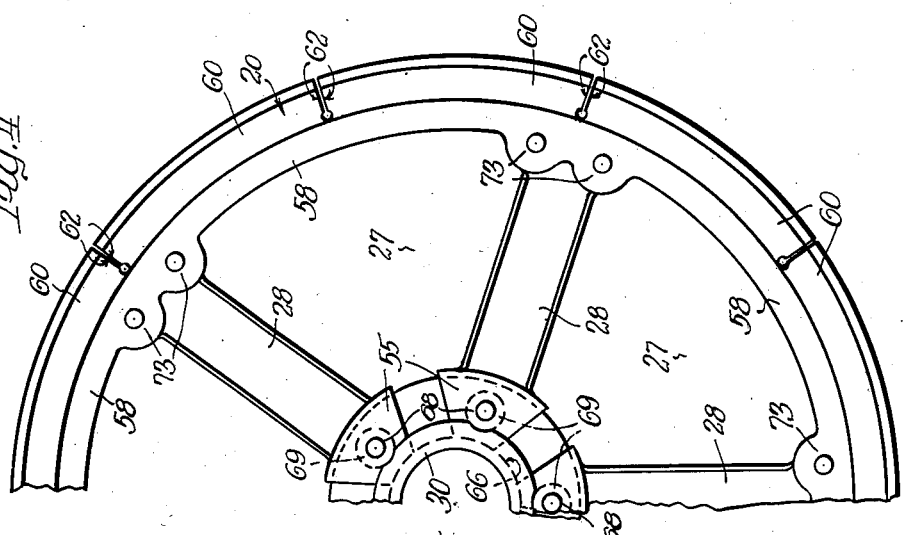
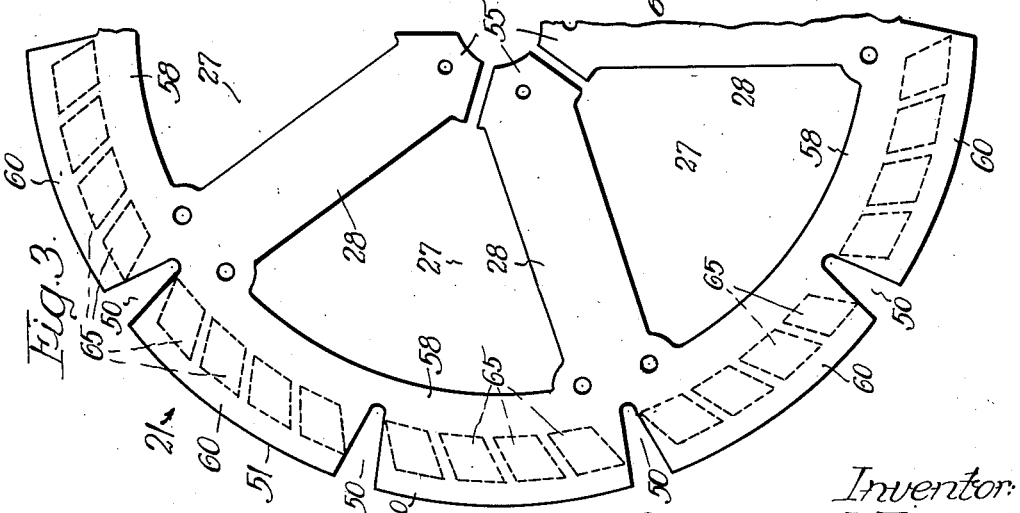
Inventor:
Clarence M. Eason
By Brown, Jackson, Boettcher & Dienner
Attys.

Patented Nov. 3, 1936

2,059,935

UNITED STATES PATENT OFFICE 2,059,935

CLUTCH

Clarence M. Eason, Waukesha, Wis., assignor to Fawick Manufacturing Co., Waukesha, Wis., a corporation of Wisconsin Application August 29, 1935, Serial No. 38,368

12 Claims. (Cl. 192—66)

This invention relates to cone friction clutches.

While the particular device which I shall describe hereinafter in connection with the drawings is a cone friction clutch for automotive apparatus, it is to be understood that the invention may be embodied in clutches for other purposes within the scope of the appended claims.

There are three types of clutches in general use for automotive purposes: the cone, the plate, and the multiple-disc types.

The present invention relates to the first-mentioned type of clutches, namely, to cone friction clutches, and more particularly to cone friction clutches of the type in which the rotation of the clutch cone is applied to the driven shaft through a flexible driving connection angularly yieldable with limited axial flexibility and including a hub splined upon the driven shaft and free of endwise pressure, and still more particularly to cone friction clutches wherein the cone rim is rigidly attached to a hub which is rotatably and endwise free upon the clutch shaft, there being a flexible connection between the cone rim and a second hub which is angularly fast and endwise free upon the driven shaft. This permits extended axial movement without at the same time causing any binding action when freeing the clutch.

One of the features of the present invention resides in the provision of a shiftable clutch cone of improved form.

Another feature resides in an improved arrangement of the spring means for engaging the shiftable clutch cone with the cooperating clutch part, and particularly in an improved arrangement whereby the spring pressure is applied directly to the cone through the hub thereof and suitable connecting arms, and wherein, at the same time, the spring pressure is applied to the driving parts through a pilot bearing therein and in an improved manner.

Another feature resides in the provision in this combination of a cone clutch member formed apart from the flywheel and attached thereto, this cone clutch member having a conical clutch surface which, for convenience in manufacture and assembly, is preferably disposed with its larger diameter toward the flywheel and its smaller diameter in the opposite direction.

Another feature resides in the combination of a cone clutch member with a conventional flexible torque absorbing drive connection between this member and the clutch shaft.

Another object resides in the provision of a cone friction clutch having a friction facing of high unit pressure capacity, and more particularly in the provision of a cone clutch having a cone member formed apart from the flywheel and attached thereto, this cone member having a chilled conical clutch surface, and the shiftable clutch cone having a metallic friction material of high unit pressure capacity for frictional engagement with the clutch surface of the cone member.

Another feature resides in an improved arrangement wherein the clutch parts are effectively ventilated at all times.

Further features of the invention will be apparent from the following detailed description, taken in connection with the accompanying drawings, in which:

Figure 3 is a fragmentary view showing a portion of the flat blank which is formed into the shiftable clutch cone part;

Figure 4 is a fragmentary front elevational view of the shiftable cone part after folding and forming the same to the desired form;

Figure 5 is a fragmentary detail section of the shiftable clutch cone part; and

Figure 1:
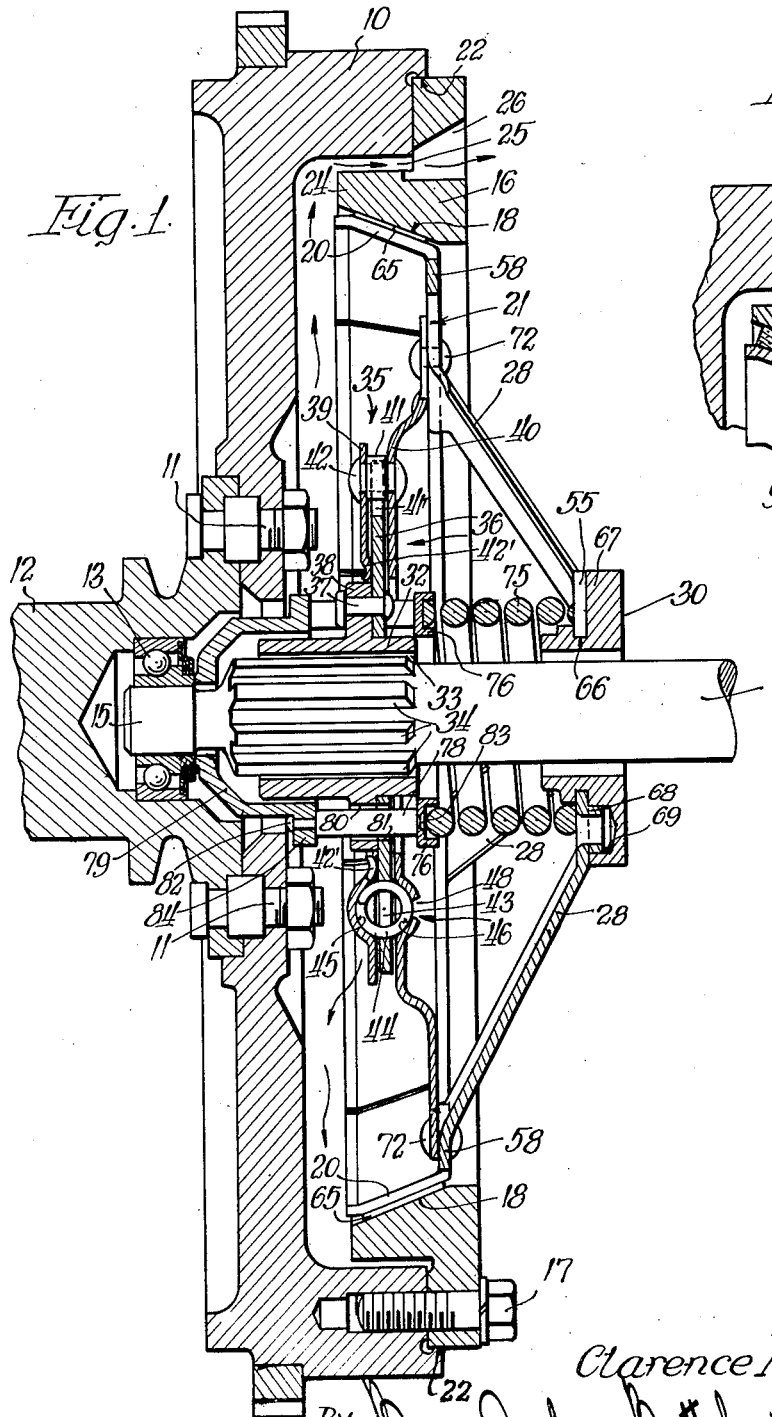
Figure 1 is a vertical longitudinal sectional view through a clutch embodying the present invention.

In the particular embodiment of the invention selected for illustration, the flywheel indicated at 10 is bolted in the usual manner as by bolts 11 to the crank shaft 12 which constitutes the driving part. The crank shaft 12 is provided with a pilot bearing 13, and the shaft 14, which constitutes the driven or clutch shaft is disposed coaxially with respect to the shaft 12 and has a reduced end 15 piloted in the bearing 13.

A cone member 16 made up apart from the flywheel 10 is bolted to the flywheel by bolts 17. This cone member 16 has the female clutch surface 18 of conical form, which, for convenience of manufacture and assembly, is reversed with respect to the usual practice, i. e., is disposed with the larger diameter of the conical surface toward the crank shaft side of the flywheel and the smaller diameter of said surface toward the opposite side of the flywheel. The making of the cone member 16 separate from the flywheel permits chilling of the cone surface 18 independently of the flywheel whereby to provide a surface which will permit using a friction material of high unit pressure capacity on the cone rim 20 of the sliding clutch member 21 as will hereinafter appear. The flywheel 10 has an annular recess 22 for receiving and centering the cone member 16 with respect thereto.

The member 16 may be formed of a different type of iron than the flywheel, and particularly an iron which will take the desired chilling and which is easy to fabricate. An alloy cast iron of suitable composition such, for example, as a chrome, nickel, silicon iron may be used with advantageous results.

The cone member 16 is disposed out at the maximum diameter of the flywheel where it has a better flywheel effect, and in the illustrated embodiment of the invention, the member 16 is about the same weight as the conventional thrust ring which would be employed if a clutch of the plate type were used with the same flywheel. Of course the weight of the member 16 may vary widely within the scope of the present invention. It may be relatively light so as not to vary appreciably the flywheel action, or it may be heavier. Where desired, the weight of the flywheel may be reduced to allow for the added weight of the cone member 16, which member may be of a size to provide a substantial portion of the flywheel action.

For the purpose of ventilating the clutch mechanism, the outer periphery of the forwardly extending annular flange 24 of the cone member 16 is spaced at 25 from the inner periphery of the rim of the flywheel, and the member 16 has a plurality of arcuate cored openings 26. The sliding clutch cone 21 has large openings 27 between the radial arms or spokes 28 thereof, and, in operation, air moves inwardly through the openings 27 into the interior of the clutch structure, past the cooperating conical clutch surfaces and the member 16, and out through the space 25 and openings 26 as shown by the arrows in Figure 1.

The sliding clutch member comprises the clutch cone 21 having the cone rim 20, the conical form of which corresponds with the conical form of the surface 18. The cone rim 20 is supported by the integral arms 28 which slope rearwardly and inwardly, and, at the center, are attached to a sleeve or hub 30 rotatably and endwise free upon the clutch shaft 14. Clutch actuating mechanism (not shown) is provided for coaction with the hub 30 for disengaging the clutch.

A second sleeve or hub 32 is arranged upon the shaft 14 forwardly of the first mentioned hub 30, and is provided with longitudinal splines 33 or equivalent means for establishing a driving connection with splines 34 on the shaft 14. The splined connection allows for axial movement of the hub 32 with respect to the shaft 14. The hub 32 is flexibly connected to the sliding clutch member by flexible connecting means indicated in its entirety at 35 whereby to connect the cone rim 20 and hub 32 yieldably in an angular direction and to allow for axial movement without at the same time causing any binding action when freeing the clutch. The hub 32 is axially free upon the clutch shaft, while remaining, however, rotationally fast with it. Thus the flexible connection offers no impediment to the axial movement of the clutch, while at the same time retaining the advantage of allowing disengagement without producing binding effects.

The particular flexible connecting means illustrated in the drawings comprises a disc 36 secured as by rivets 37 to an annular flange 38 on the hub 32, and a pair of discs 39 and 40 are disposed upon opposite sides of the disc 36 and preferably spaced slightly from the sides of this last mentioned disc, as shown. The discs 39 and 40 are spaced by spacers 41, the length of each of which is slightly greater than the thickness of the disc 36 to provide the spacing above mentioned. The spacers 41 are disposed in peripheral notches 41' in the disc 36, the edges of which by their coaction with the spacers positively stop rotational movement of the discs 39 and 40 with respect to the disc 36. Rivets 42 passing through the discs 39 and 40 and spacers 41 secure the discs 39 and 40, together. To provide the desired action without restriction, the plate 39, adjacent its inner margin, is provided with an annular indentation 42' which bears against the disc 36.

The disc 36 has a plurality of circumferentially arranged rectangular openings 43 in which coiled springs 44 for yieldably connecting the discs 39 and 40 with the disc 36 are disposed. The discs 39 and 40 have rectangular pockets 45 and 46, respectively, in which the springs 44 fit on opposite sides of the disc 36, and the springs 44 thus constitute a yieldable driving connection between the cone rim 20 and the hub 32. The pockets 45 may be formed in the disc 39 by pressing the same therein as shown, and the pockets 46 may be formed by slitting the disc 40 at 48 and pressing the metal on opposite sides of the slits 48 to the desired configuration. The disc 40 preferably has limited flexibility in an axial direction sufficient to let the hub 32 stop sliding and permit the cone rim 20 to engage the conical clutch surface 18 without restriction or chattering.

The flexible connecting means shown at 35 is similar to flexible connecting means now in use between the friction disc or plate and the hub of plate clutches of a well known automobile. It is to be understood that this particular flexible connecting means is merely illustrative of a suitable flexible connecting means for use in the present device, and that this means may vary widely within the scope of the appended claims. For example, the flexible connection comprising plastic or yielding bushings of rubber or similar material, as shown in my copending application, Serial No. 731,614, filed June 21, 1934, or in my copending application, Serial No. 23,558, filed May 27, 1935, may be employed in lieu of the particular flexible connection selected for illustration in the present application.

The sliding clutch member, with its cone rim 20, is preferably made of sheet steel of the desired gauge, or other flat stock similar to the manner of making the cone rim part of the clutch shown in the last mentioned of my above referred to copending applications. The flat sheet is stamped or otherwise cut to the form shown in Figure 3, and its outer periphery is notched at circumferentially spaced positions at 50. The notches 50 are of generally V-shaped form, with their wide ends at the outer periphery 51 of the flat member and their inner ends spaced outwardly from the inner periphery of the rim forming part of this member. Circumferentially spaced sector-like portions are stamped or otherwise cut out to form the openings 27 with the radial arms or spokes 28 disposed between the respective openings. The outer ends of the arms 28 are integral with the rim forming part of the plate, and the inner ends of these arms are separated and shaped as shown at 55.

The blank, with its outer margin slotted at 50 and which is to constitute the sliding clutch member, is placed between a pair of conical die members (not shown) and pressed to form the conical rim part 20 with the flange 58 and the conected arms 28, as shown in Figures 4 and 5. The die means, instead of drawing a conical rim from flat stock, which is a difficult manufacturing operation requiring large and expensive presses, merely folds or forms the freed portions 60 between the notches 50 in from the plane of the flange part 58 to the desired conical form, as shown. The edges of the segment-like portions 60 preferably abut when the rim is collapsed or contracted, whereby the cone rim is in the form of a continuous arch structure, with each segment-like portion 60 acting as a keystone or arch in said structure. As a result, this arched structure of the cone rim has just as much strength as a solid cone rim.

By avoiding the difficult drawing operations for drawing a cone rim from flat stock and employing merely a folding and forming operation to bring the segment-like portions 60 to the desired conical form, the cost and difficulty of forming the cone rim are greatly reduced. The drawing operations heretofore employed, in addition to being difficult, required large and costly presses, whereas the folding and forming operation which I employ can be done on a small inexpensive press.

In addition, due to the inherent springiness of the stock which is preferably employed, the conically arranged segments 60 have a tendency to spring open slightly. This gives the conical rim 20 of the cone member a slightly greater angle than the cooperating female cone surface 18 of the cone member 16. As a result, when the clutch is engaged, the cone rim 20 bears first on its outer enlarged portion and, with comparatively little force, is collapsed to proper angularity for full engagement with the clutch surface 18. This gives a softer acting clutch which engages more smoothly, and in which the tendency of the clutch to grab, stutter, or chatter during engagement is eliminated. The structure of the cone member 21, with the flow or springing action of the cone rim part 20 and the friction facing to be hereinafter described, are important aspects of the present invention. The springing action above mentioned is obtained without placing a spring under the clutch facing to give an initial grab and to make the clutch smoother acting as commonly resorted to heretofore in the art. When the cone rim 20 is in full engagement with the clutch surface 18, the edges 62 of the segment-like portions 60 are preferably in abutting engagement and present a solid cone rim of great strength.

The outer conical surfaces of the cone rim segments 60 are faced with a friction material of high unit pressure capacity, which, in the cone clutch herein described, constitutes another important aspect of the present invention. This friction material may be in the form of thin light-weight metallic friction pads 65 of high unit pressure capacity, brazed to the conical rim forming segments 60. Instead of being in the form of separate circumferentially spaced pads 65, this metallic friction facing may be in the form of arcuate facing strips, each of a length substantially equal to the lengths of the segments 60.

Friction facings of high unit pressure capacity may be very thin and light in weight, and at the same time are capable of taking five times as much pressure per unit of area as any of the organic bound friction materials now commonly employed in cone clutches. It is to be understood, however, that certain features of the present invention may be employed regardless of the character of the friction facing material. In the case, however, of the metallic friction facings 65, these facings are preferably brazed or secured to the cone rim forming part in equivalent manner while the blank is flat, and preferably before folding and forming the segment-like portions 60 and the arms 28 to the desired form.

The folding and forming of the cone to the desired shape as distinguished from drawing it to shape has special correlation with respect to the friction facing or facings of high unit pressure capacity, in that these facings may be applied to the flat blank and the blank then folded and formed to shape without cracking or loosening the facings. If the outer margin of the blank was continuous and drawn to shape the friction facings would be subjected to the drawing operation and because of their brittleness would tend to crack or loosen from the plate.

The present invention is not limited to the use of friction facings of high unit pressure capacity. For example, the cone may be formed of suitable non-ferrous material having the usual low coefficient of friction and this low coefficient of friction may be compensated for by reducing the angle of the cone.

Figure 6:
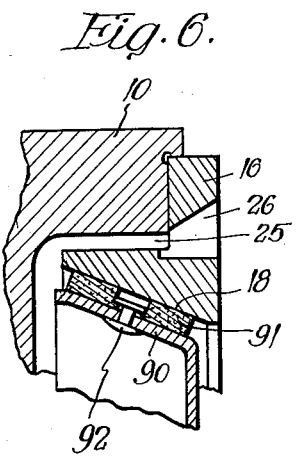
Figure 6 is a fragmentary detail section showing a typical low unit pressure cone for use with the present invention when the inertia of the cone is not a governing factor in its use.
Figure 2:
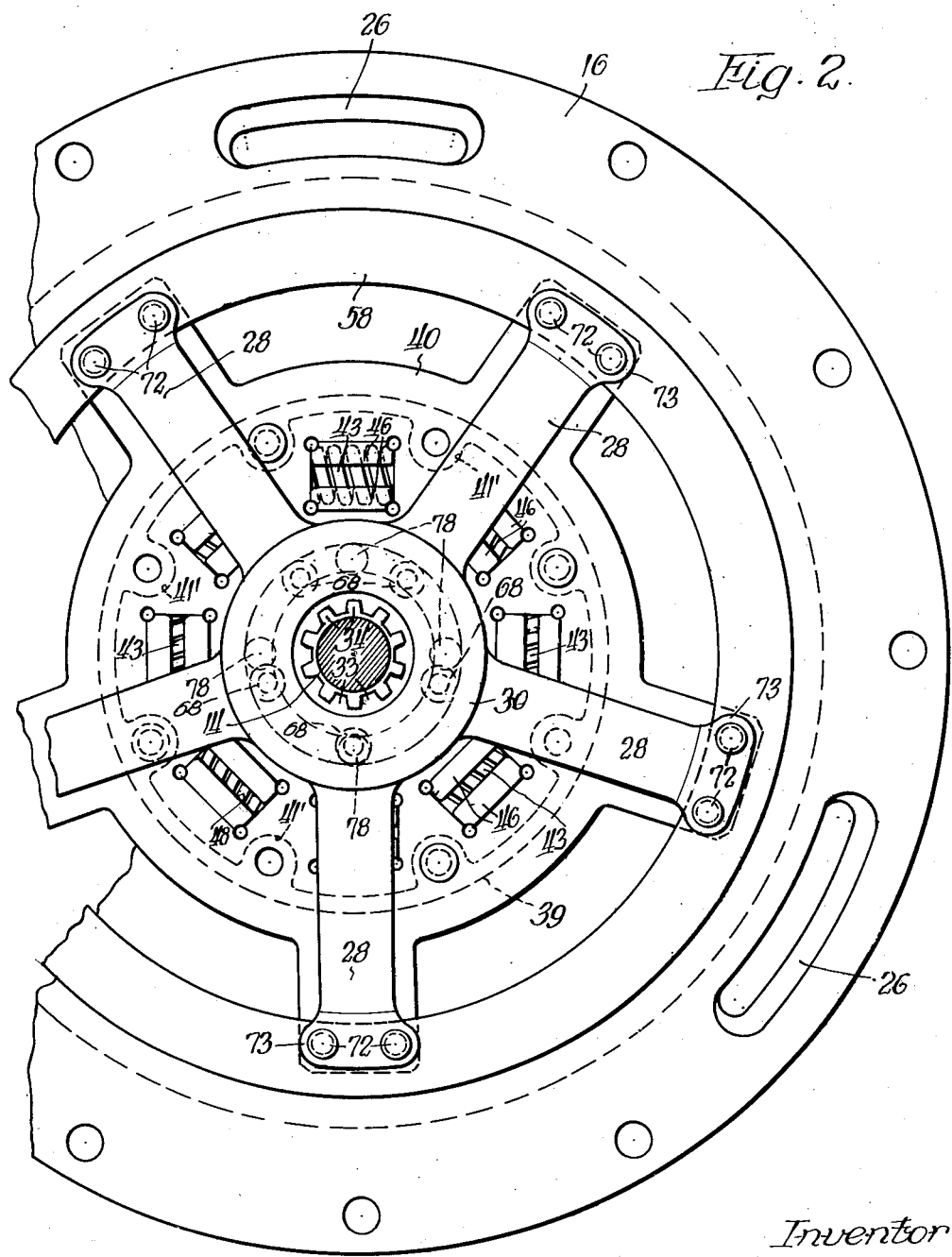
Figure 2 is a rear elevational view of the clutch shown in Figure 1, with the driven shaft in section.

For heavy duty industrial work, where the inertia of the cone is not a governing factor in its use, the usual organic bound friction material of relatively low unit pressure capacity may be employed upon the cone 90 as indicated at 91 in Figure 6. In such case the length of the cone and the cooperating cone surface of the cone member attached to the flywheel are increased, and the facing 91 is shown as secured to the cone rim 90 by rivets 92. Otherwise the structure of the clutch is the same as shown in Figures 1 and 2.

Upon bringing the cone rim part into the desired conical form and sloping the arms 28 rearwardly and inwardly with their inner ends turned radially, the cone member 21 is applied to the hub 30. The hub 30 has an annular groove 66, and an annular shoulder 67. The inner ends of the arms 28 are placed against the shoulder 67 with their inner edges engaged in the groove 66, as shown in Figure 5. The inner ends of the arms have small openings 68 adjacent recesses 69 in the hub and the walls of the arms 28 adjacent the openings 68 are punched into recesses 69 to hold the inner ends of the arms 28 against radial displacement from the hub and to connect the cone rim 20 and hub 30 against relative rotation. The disc 40 of the flexible driving connection between the cone rim part and the hub 32 is offset rearwardly outwardly of the disc 36, and is riveted at 72 to the flange portion 58 of the sliding cone member, the flange 58 being provided with apertured scallops 73 for this purpose, as shown in Figure 4.

When the clutch is assembled, the cone rim 20 is normally held in engagement with the clutch surface 18 by the spring 75. This spring is confined between the hub 30 and an abutment ring 76, and the pressure of the spring is applied directly to the cone rim through the hub 30 and arms 28. The angularity of the cooperating friction cone surfaces gives a multiplication to the spring pressure. In an illustrative embodiment of the invention with a single spring at 75, exerting a pressure of 300 pounds end thrust on the cone results in a normal pressure between the coacting friction surfaces of approximately 1,000 pounds due to the angularity of the cone surfaces. The action of the spring 75 against the inner ends of the arms 28 holds the punched-in portions in the recesses 69.

At the same time the free mass is made as light as possible, with the result that spinning after the clutch is disengaged, which would interfere with shifting gears, is eliminated. The cover plate, as well as the levers and their linkages required in the usual plate clutch, are eliminated, which constitutes a net saving over such a clutch.

The pressure of the spring 75 is transferred to the crank shaft 12 through the pilot bearing 13 and free of the hub 32 and the remainder of the driving connection between the cone rim 20 and the driven shaft 14. This is accomplished by supporting the ring 76 upon the adjacent ends of posts 78, which, in turn, are supported by a thrust member 79. This member 79 is cup-shaped in the illustrated embodiment, and bears at its left-hand end (Fig. 1) against the inner race of the pilot bearing 13. If the pilot bearing is in the web of the flywheel instead of in the crank shaft, as shown, this thrust member 79 may be in the form of a plate with a slight indentation. The posts 78 pass through openings 80 and 81 in the flange 38 of the hub 32 and disc 36, respectively. These openings are sufficiently larger than the posts 78 to free the hub 32 and disc 36 of the spring action at all times.

The opposite ends of the posts 78 may be reduced and riveted at 82 and 83, respectively, to the flange 84 on the thrust member 79 and abutment ring 76, respectively. The ring 76 is preferably of channel section to hold the adjacent end of the spring 75 against lateral displacement.

In use, the pressure of the spring 75 is applied directly to the cone rim 20 through the hub 30 and arms 28, and the pressure of the spring at the opposite end is transferred to the crank shaft 12 through the thrust member 79 and pilot bearing 13. The rotation of the flywheel is applied to the driven shaft 14 through separate parts, namely, through the cone rim part, discs 39 and 40, disc 36, and hub 32 with its splined connection to the shaft 14. The rotation is applied free of endwise pressure, and the hub 32 and other rotation transmitting parts being free of the spring pressure, there is not at any time any binding action along the splines 33 and 34. At the same time the hub 32, freed of spring pressure, has flexible connection with the cone rim 20 by a flexible connection which allows the necessary axial movement for engagement and disengagement of the clutch.

When the clutch is dismantled, the entire assembly, including the cone clutch member 21 with its cone rim and arms 28, collar 30, spring 75, abutment ring 76, posts 78, thrust member 79, and the flexible driving connection including the discs 36, 39 and 40, and, in fact, everything up to the pilot bearing 13 is self-contained and may be assembled and dismantled as a unit. In assembling the clutch, the above mentioned parts are assembled and applied as a unit, whereupon the cone member 16 is bolted in place. The reversal of the cone surface 18 and the cooperating cone rim facilitates manufacture and assembly.

The clutch actuating mechanism (not shown), for coaction with the hub 30, operates to shift this hub to the left (Figure 1) and thereby to move the clutch cone 21 out of engagement with the cone surface 18. When the clutch actuating mechanism is released, the spring, by its action upon the hub 30, moves the cone rim into frictional engagement with the cone surface 18 entirely free of the driving parts between the cone rim and the shaft 14.

It will be seen that the invention thus provides the combination of a driving hub freed of spring pressure, with a flexible driving connection between it and the cone rim 20. The desired axial movement is obtained without any binding action when freeing the clutch, and the free mass is light in weight to avoid spinning after the clutch is disengaged. Furthermore, the high unit pressure capacity of the cooperating friction surfaces, with the relatively large mean radius of the friction material, enables the use of cone surfaces which are relatively short.

I do not intend to be limited to the precise details shown or described. Other modifications are also contemplated within the scope of the appended claims.

I claim:

1. In a cone friction clutch, the combination of a driving part comprising a driving shaft and a flywheel, a pilot bearing in said driving part, a driven shaft coaxial with said first mentioned shaft and piloted in said bearing, a sliding clutch cone comprising a cone rim, a hub rotatably and endwise free on the driven shaft and connecting arms between said cone rim and said hub, a second hub rotatably fast and endwise free upon said driven shaft, means flexibly connecting said sliding clutch cone and said second hub for transmitting rotation of the sliding clutch cone to the driven shaft, a thrust member acting endwise against said pilot bearing, an abutment member, supports for said abutment member carried by said thrust member and extending through said last hub and free thereof, spring means confined between said abutment member and said first hub for applying spring pressure directly to the sliding clutch cone through said first hub and said connecting arms, the pressure of said spring means in the opposite direction being transferred to the driving part through said thrust member and said pilot bearing.

2. In a cone friction clutch, the combination of a driving part comprising a driving shaft and a flywheel, a pilot bearing in said driving part, a driven shaft coaxial with said first mentioned shaft and piloted in said bearing, a sliding clutch cone comprising a cone rim, a hub rotatably and endwise free on the driven shaft and connecting arms between said cone rim and said hub, a second hub rotatably fast and endwise free upon said driven shaft, means flexibly connecting said sliding clutch cone and said second hub for transmitting rotation of the sliding clutch cone to the driven shaft, a thrust member acting endwise against said pilot bearing, an abutment member, supports for said abutment member carried by said thrust member and extending through said last hub and free thereof, spring means confined between said abutment member and said first hub for applying spring pressure directly to the sliding clutch cone through said first hub and said connecting arms, the pressure of said spring in the opposite direction being transferred to the driving part through said thrust member and said pilot bearing, and a cone member formed apart from the flywheel and attached thereto, said cone member having a conical clutch surface disposed with its larger diameter toward the flywheel and its smaller diameter in the opposite direction.

3. In a cone friction clutch, the combination of a driving part comprising a driving shaft and a flywheel provided with a rim portion, a pilot bearing in said driving part, a driven shaft coaxial with said first mentioned shaft and piloted in said bearing, a sliding clutch cone comprising a cone rim, a hub rotatably and endwise free on the driven shaft and connecting arms between said cone rim and said hub, a second hub rotatably fast and endwise free upon said driven shaft, means flexibly connecting said sliding clutch cone and said second hub for transmitting rotation of the sliding clutch cone to the driven shaft, a thrust member acting endwise against said pilot bearing, an abutment member, supports for said abutment member carried by said thrust member and extending through said last mentioned hub and free thereof, spring means confined between said abutment member and said first hub for applying spring pressure directly to the sliding clutch cone through said first hub and said connecting arms, the pressure of said spring means in the opposite direction being transferred to the driving part through said thrust member and said pilot bearing, and a cone member formed apart from the flywheel and attached thereto with a portion extending into the rim of the flywheel and spaced radially therefrom, said last cone member having openings communicating with the space between the rim of the flywheel and the portion of the cone member extending within said rim and having a conical clutch surface disposed with its larger diameter toward the flywheel.

4. In a cone friction clutch, the combination of a driving part comprising a driving shaft and a flywheel, a pilot bearing in said driving part, a driven shaft coaxial with said first mentioned shaft and piloted in said bearing, a sliding clutch cone comprising a cone rim, a hub rotatably and endwise free on the driven shaft and connecting arms between said cone rim and said hub, a second hub rotatably fast and endwise free upon said driven shaft, means flexibly connecting said sliding clutch cone and said second hub for transmitting rotation of the sliding clutch cone to the driven shaft, a thrust member acting endwise against said pilot bearing, an abutment member, supports for said abutment member carried by said thrust member and extending through said last hub and free thereof, spring means confined between said abutment member and said first hub for applying spring pressure directly to the sliding clutch cone through said first hub and said connecting arms, the pressure of said spring means in the opposite direction being transferred to the driving part through said thrust member and said pilot bearing, a cone member formed apart from the flywheel and attached thereto, said cone member having a chilled conical clutch surface disposed with its larger diameter toward the flywheel and its smaller diameter in the opposite direction, and a facing of metallic friction material having a high unit pressure capacity on the cone rim of said sliding clutch cone for frictional engagement with the chilled conical clutch surface of said cone member.

5. In a cone friction clutch, the combination of a driving part comprising a driving shaft and a flywheel, a pilot bearing in said driving part, a driven shaft coaxial with said first mentioned shaft and piloted in said bearing, a sliding clutch cone comprising a cone rim, a hub rotatably and endwise free on the driven shaft and connecting arms between said cone rim and said hub, a second hub rotatably fast and endwise free upon said driven shaft, a radial flange on said second hub, means flexibly connecting said sliding clutch cone and said hub for transmitting rotation of the sliding clutch cone to the driven shaft, said means comprising a disc secured to the flange of said second hub and having peripheral notches and circumferentially arranged openings, a pair of discs one disposed on each of the opposite sides of said first disc, one of said second discs being secured to said sliding clutch cone, spacers disposed in the peripheral notches of said first disc and between said second discs, rivets passing through said second discs and said spacers and joining said second discs, pockets in said second discs, springs disposed in the circumferentially arranged openings in said first disc and engaging in the pockets in said second discs, a thrust member acting endwise against said pilot bearing, an abutment member, supports for said abutment member carried by said thrust member and extending through said second hub and free thereof, a spring coiled about said driven shaft and confined between said abutment member and said first hub for applying spring pressure directly to the sliding clutch cone through said first hub and said connecting arms, the pressure of said spring in the opposite direction being transferred to the driving part through said thrust member and said pilot bearing.

6. In a cone friction clutch, the combination of a driving part comprising a driving shaft and a flywheel, a pilot bearing in said driving part, a driven shaft coaxial with said first shaft and piloted in said bearing, a sliding clutch cone having a connected hub rotatably and endwise free on the driven shaft, a second hub rotatably fast and endwise free on said driven shaft, a flexible driving connection between said sliding clutch cone and said last hub, a cone member formed apart from the flywheel and attached thereto, said cone member having a cone clutch surface disposed with its larger diameter toward the flywheel and adapted for frictional engagement with said sliding clutch cone, and spring means acting endwise against said first hub at one end and endwise past the plane of said flexible driving connection and against said pilot bearing at its opposite end for engaging said clutch cone with said last cone member.

7. In a cone friction clutch, the combination of a driving member, a driven shaft, a sliding clutch cone, a hub splined upon the driven shaft and axially movable thereon, a disc secured to said hub and having peripheral notches and circumferentially arranged openings, a pair of discs one disposed on each of the opposite sides of said first disc, means securing one of said second discs to said sliding clutch cone, means extending through the peripheral notches in said first disc and joining said second discs, said second discs having circumferentially arranged pockets adjacent the openings in said first disc, springs disposed in the openings in said first disc and engaging in said pockets flexibly to connect said first disc and said second discs and thereby said hub and said sliding clutch cone, a second hub connected to said sliding clutch cone and rotatably and endwise free on the driven shaft, and a clutch spring acting against said driving member and said second hub free of said first hub.

8. In a cone friction clutch, the combination of a driving part comprising a driving shaft and a flywheel, a coaxial driven shaft, a pilot bearing in said driving part, a thrust member acting endwise against said pilot bearing, a spring abutment ring, and a plurality of posts disposed adjacent the driven shaft and parallel with the axis of said shaft, said posts being joined to said thrust member and said abutment ring for supporting the abutment ring on said thrust member and transferring the spring thrust to said driving part through said thrust member and said pilot bearing.

9. A cone clutch member formed of a flat plate and having circumferentially spaced notches opening from its outer periphery and extending inwardly to position spaced inwardly from the outer periphery of the plate, the portions of said plate between said notches being disposed obliquely to form a conical rim and of resilient character and adapted to abut edgewise by engagement of said cone clutch member with a cooperating clutch member, radially extending and circumferentially spaced arms integral with said rim and sloping inwardly and rearwardly therefrom, and a hub at the inner ends of said arms.

10. A cone clutch member formed of a flat plate and having circumferentially spaced notches opening from its outer periphery and extending inwardly to position spaced inwardly from the outer periphery of the plate, the portions of said plate between said notches being disposed obliquely to form a conical rim, radially extending and circumferentially spaced arms integral with said rim, a grooved hub member having a radial flange provided with circumferentially spaced recesses, said arms sloping inwardly and rearwardly to position adjacent said hub member and having their inner ends positioned against said flange and engaged with the groove in said hub member, the inner ends of said arms having portions engaged with the recesses in the flange of said hub member to connect the cone clutch member and said hub member against relative rotation.

11. In combination, a driving member, a pilot bearing therein, a coaxial driven member, a clutch member having a radially extending part rotatably fast and endwise free on said driven member, a clutch spring, and means extending through the radially extending part of said clutch member for transferring the thrust of said spring to the driving part through said pilot bearing.

12. In combination, a driving member, a pilot bearing therein, a coaxial driven member, a clutch member having a radially extending part rotatably fast and endwise free on said driven member, a clutch spring, and means extending across the plane of the radially extending part of said clutch member and disposed externally of said driven member for transferring the thrust of said spring to the driving member through said pilot bearing.

CLARENCE M. EASON.